(12) United States Patent
Alexander

(10) Patent No.: US 8,223,208 B2
(45) Date of Patent: Jul. 17, 2012

(54) DEVICE AND METHOD FOR CALIBRATING AN IMAGING DEVICE FOR GENERATING THREE DIMENSIONAL SURFACE MODELS OF MOVING OBJECTS

(75) Inventor: Eugene J. Alexander, San Clemente, CA (US)

(73) Assignee: Motion Analysis Corporation, Santa Rosa, CA (US)

( * ) Notice: Subject to any disclaimer, the term of this patent is extended or adjusted under 35 U.S.C. 154(b) by 1368 days.

(21) Appl. No.: 11/595,573

(22) Filed: Nov. 10, 2006

(65) Prior Publication Data

US 2007/0104361 A1    May 10, 2007

Related U.S. Application Data

(60) Provisional application No. 60/735,934, filed on Nov. 10, 2005.

(51) Int. Cl.
*H04N 17/00* (2006.01)
(52) U.S. Cl. .......................... 348/187; 348/744
(58) Field of Classification Search .......... 348/187, 348/135–136, 137, 42–43, 241, 627, 333.1, 348/222.1, 189–192, 744; 382/289, 209, 382/194; *H04N 17/00*
See application file for complete search history.

(56) References Cited

U.S. PATENT DOCUMENTS

| | | | |
|---|---|---|---|
| 3,965,753 A | 6/1976 | Browning, Jr. | |
| 4,639,878 A | 1/1987 | Day et al. | |
| 4,965,667 A | 10/1990 | Trew et al. | |
| 5,008,804 A | 4/1991 | Gordon et al. | |
| 5,268,998 A | 12/1993 | Simpson | |
| 5,495,576 A | 2/1996 | Ritchey | |
| 5,745,126 A | 4/1998 | Jain et al. | |
| 5,852,672 A | 12/1998 | Lu | |
| 5,889,550 A | 3/1999 | Reynolds | |
| 6,114,824 A | 9/2000 | Watanabe | |
| 6,377,298 B1 * | 4/2002 | Scheele et al. | 348/187 |
| 6,380,732 B1 | 4/2002 | Gilboa | |
| 6,519,359 B1 | 2/2003 | Nafis et al. | |

(Continued)

FOREIGN PATENT DOCUMENTS

| | | |
|---|---|---|
| EP | 1 408 702 A | 4/2004 |
| WO | 9735166 A1 | 9/1997 |
| WO | 9742601 A1 | 11/1997 |

(Continued)

OTHER PUBLICATIONS

Grau O et al: "A Combined Studio Production System for 3-D Capturing of Live Action and Immersive Actor Feedback" IEEE Transactions on Circuits and Systems for Video Technology, IEEE Service Center, Piscataway, NJ, US LNKD- DOI:10.1109/TCSVT.2004. 823397, vol. 14, No. 3, Mar. 1, 2004, pp. 370-380, XP011108802 ISSN: 1051-8215.

(Continued)

*Primary Examiner* — Trang U Tran
(74) *Attorney, Agent, or Firm* — Manatt, Phelps & Phillips, LLP; Robert D. Becker; Rhys W. Cheung

(57) ABSTRACT

A device and technique are presented to calibrate an imaging device for generating three-dimensional surface models of moving objects and calculating three-dimensional coordinates of detected features relative to a coordinate system embedded in the device. The internal projector and camera parameters, i.e., zoom, focus, aperture, optical center, logical pixel size, aspect ratio, are determined for all projectors and cameras and all possible focal planes of the device in operation.

16 Claims, 6 Drawing Sheets

U.S. PATENT DOCUMENTS

| | | | |
|---|---|---|---|
| 6,594,600 | B1 | 7/2003 | Arnoul et al. |
| 6,768,509 | B1 * | 7/2004 | Bradski et al. ........... 348/207.99 |
| 6,788,333 | B1 | 9/2004 | Uyttendaele et al. |
| 6,816,187 | B1 * | 11/2004 | Iwai et al. ..................... 348/187 |
| 7,274,388 | B2 * | 9/2007 | Zhang ........................... 348/187 |
| 7,403,853 | B1 | 7/2008 | Janky et al. |
| 2001/0030744 | A1 | 10/2001 | Chang |
| 2002/0050988 | A1 | 5/2002 | Petrov et al. |
| 2002/0164066 | A1 | 11/2002 | Matsumoto |
| 2002/0184640 | A1 | 12/2002 | Schnee et al. |
| 2003/0085992 | A1 | 5/2003 | Arpa et al. |
| 2004/0128102 | A1 | 7/2004 | Petty et al. |
| 2004/0223077 | A1 | 11/2004 | Said et al. |
| 2005/0136819 | A1 | 6/2005 | Kriesel |
| 2005/0168381 | A1 | 8/2005 | Stephens |

FOREIGN PATENT DOCUMENTS

| | | | |
|---|---|---|---|
| WO | 9810246 | A1 | 3/1998 |
| WO | 00/00926 | A | 1/2000 |
| WO | 00/27131 | A | 5/2000 |
| WO | 03044734 | A2 | 5/2003 |
| WO | 20041106856 | A | 12/2004 |
| WO | 20041109228 | A | 12/2004 |
| WO | 2005065283 | A2 | 7/2005 |

OTHER PUBLICATIONS

Grau O et al: "The ORIGAMI Project: Advanced tools for creating and mixing real and virtual content in film and TV production Visual media production" IEE Proceedings: Vision, Image and Signal Processing, Institution of Electrical Engineers, GB LNKD- DOI:10.1049/IP-VIS:20045134, vol. 152, No. 4, Aug. 5, 2005, pp. 454-469, XP006024838 ISSN: 1350-245X.

Ito, Y and Saito, H: "Free viewpoint image synthesis using uncalibrated multiple moving cameras" Computer Vision / Computer Graphics Collaboration Techniques and Applications (MIRAGE2005) Mar. 2, 2005, pp. 173-180, XP002608385 Retrieved from the Internet: URL:http://citeseerx.ist.psu.edu/viewdoc/summary? doi=10.1.1.81.5150 [retrieved on Nov. 1, 2010].

Thomas G A et al: "A versatile camera position measurement system for virtual reality TV production" Broadcasting Convention, 1997. IBS 97., International (Conf. Publ. 447 ) Amsterdam, Netherlands Sep. 12-16, 1997, London, UK,IEE, UK LNKD- DOI:10.1049/CP:19971284, Sep. 12, 1997, pp. 284-289, XP006508771 ISBN: 978-0-85296-694-5.

Nicola D'Apuzzo: 'Digitization of the Human Body in the Present-Day Economy: On the actual state of the technology and its exploitation for commercial applications', [Online] Apr. 5, 2004, XP55009675 Retrieved from the Internet: [retrieved on Oct. 17, 2011].

Gregor A. Kalberer; Luc Van Gool: 'Realistic face animation for speech,' The Journal of Visualization and Computer Animation, 2002, 13:97-106, DOI: 10.1002/vis283.

* cited by examiner

DEVICE AND METHOD FOR CALIBRATING AN IMAGING DEVICE FOR GENERATING THREE DIMENSIONAL SURFACE MODELS OF MOVING OBJECTS

BACKGROUND OF THE INVENTION

1. Field of the Invention

The invention relates generally to apparatus and methods for generating three dimensional surface models of moving objects, and more particularly devices and methods for determining a parameterization of the optical characteristics of the elements of a device.

2. Background of the Invention

The generation of three dimensional models of moving objects has uses in a wide variety of areas, including motion pictures, computer graphics, video game production, human movement analysis, orthotics, prosthetics, surgical planning, sports medicine, sports performance, product design, surgical planning, surgical evaluation, military training, and ergonomic research.

Two existing technologies are currently used to generate these moving 3D models. Motion capture techniques are used to determine the motion of the object, using retro-reflective markers such as those produced by Motion Analysis Corporation, Vicon Ltd., active markers such as those produced by Charnwood Dynamics, magnetic field detectors such as those produced by Ascension Technologies, direct measurement such as that provided by MetaMotion, or the tracking of individual features such as that performed by Peak Performance, Simi. While these various technologies are able to capture motion, nevertheless these technologies do not produce a full surface model of the moving object, rather, they track a number of distinct features that represent a few points on the surface of the object.

To supplement the data generated by these motion capture technologies, a 3D surface model of the static object can be generated. For these static objects, a number of technologies can be used for the generation of full surface models: laser scanning such as that accomplished by CyberScan, light scanning such as that provided by Inspeck, direct measurement such as that accomplished by Direct Dimensions, and structured light such as that provided by Eyetronics or Vitronic).

While it may be possible to use existing technologies in combination, only a static model of the surface of the object is captured. A motion capture system must then be used to determine the dynamic motion of a few features on the object. The motion of the few feature points can be used to extrapolate the motion of the entire object. In graphic applications, such as motion pictures or video game production applications, it is possible to mathematically transform the static surface model of the object from a body centered coordinate system to a global or world coordinate system using the data acquired from the motion capture system.

All of these surface generation systems are designed to operate on static objects. Even when used in combination with a motion capture system, as described above, an object that is not a strictly rigid body is not correctly transformed from a body centered coordinate system, as a single static surface models does not adequately represent the non rigid motion of the object. Therefore, there exists a need for a systems and methods that can produce a model of the surface a three dimensional object, with the object possibly in motion and the object possibly deforming in a non-rigid manner.

A device and method is needed for calibrating the imaging device. In order to achieve this goal, a novel method of parameterizing the optical characteristics of the imaging elements of the device is presented. In one embodiment, the internal camera parameters are determined. These parameters change depending on the mathematical model of the camera that is used, ranging from the very simplistic to the more sophisticated. Furthermore, a novel device is provided which is intended to operate with dynamic optical properties, changing zoom, focus, and aperture settings. In addition, the current invention teaches a novel method for determining the camera parameterization over a range of imaging device settings.

BRIEF DESCRIPTION OF THE DRAWINGS

The drawings illustrate the design and utility of preferred embodiments of the invention, in which similar elements are referred to by common reference numerals and in which.

DETAILED DESCRIPTION

Figure 1:
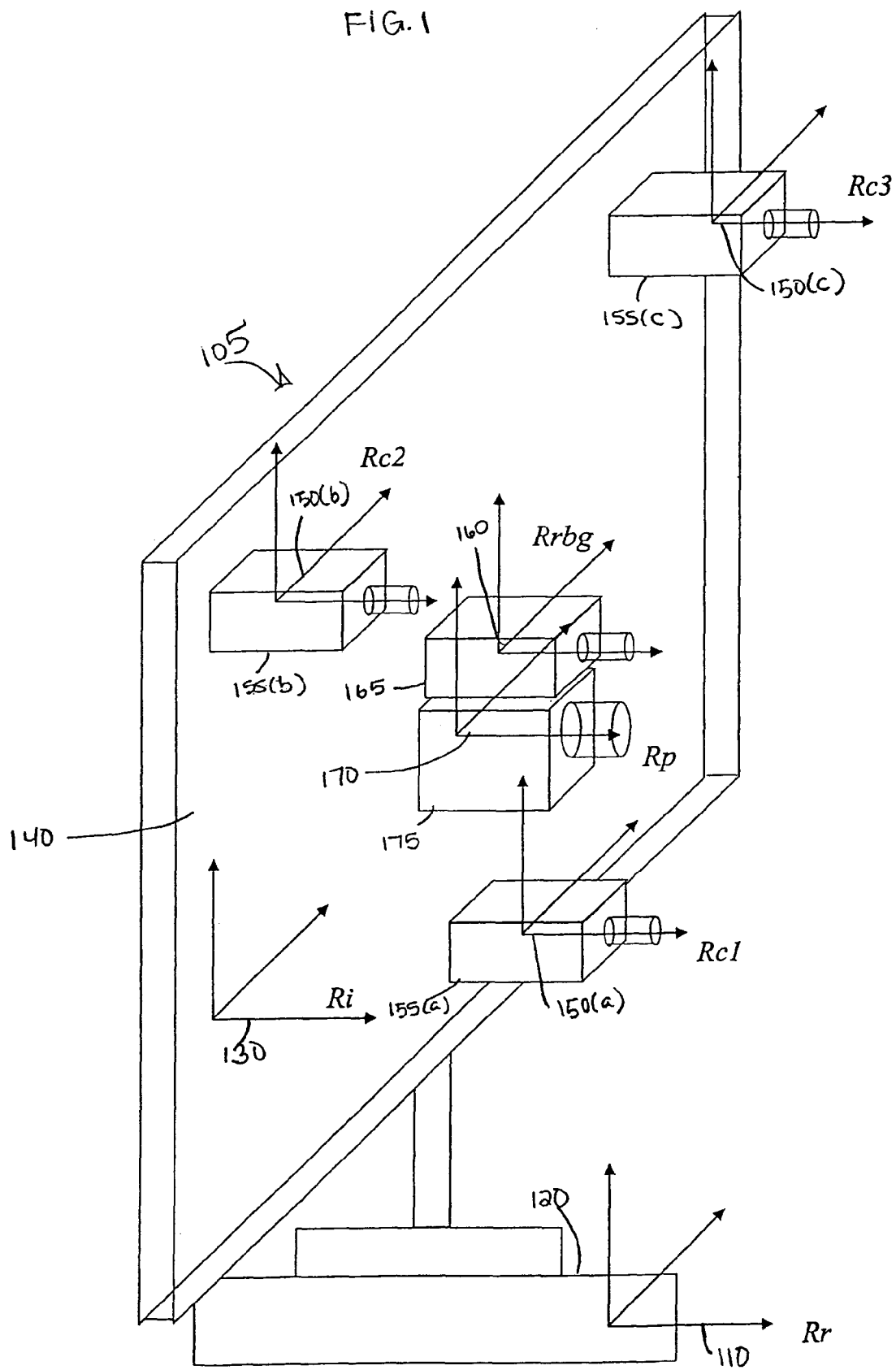
FIG. 1 is an asymmetric view of an imaging device illustrating the various embedded coordinate systems.

Various embodiments of the invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. The embodiments are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

Devices which combine cameras and a projector into one device are referred to as imaging devices.

The imaging device is a device that is capable of producing a three dimensional representation of the surface of one aspect of a three dimensional object such as the device described in U.S. patent application Ser. No. pending, entitled Device for Generating Three Dimensional Surface Models of Moving Objects, filed on Oct. 4, 2006, which is incorporated by reference into the specification of the present patent in its entirety.

Such an imaging device has a mounting panel. Contained within the mounting panel of the imaging device are grey scale digital video cameras. There may be as few as two grey scale digital video cameras and as many grey scale digital video cameras as can be mounted on the mounting panel. The more digital video cameras that are incorporated, the more detailed the model generated is. The grey scale digital video cameras may be time synchronized. The grey scale digital video cameras are used in pairs to generate a 3D surface mesh of the subject. The mounting panel may also contain a color digital video camera. The color digital video camera may be used to supplement the 3D surface mesh generated by the grey scale camera pair with color information.

Each of the video cameras have lenses with electronic zoom, aperture and focus control. Also contained within the mounting panel is a projection system. The projection system has a lens with zoom and focus control. The projection system allows an image, generated by the imaging device, to be cast on the object of interest, such as an actor or an inanimate object.

Control signals are transmitted to the imaging device through a communications channel. Data is downloaded from the imaging device through another communications channel. Power is distributed to the imaging device through a power system. The imaging device may be controlled by a computer (e.g. a data processing system with a processor, memory, et cetera.).

Turning now to the drawings, FIG. 1 is an asymmetric view of an imaging device 105. The imaging device 105 has a rigid coordinate system 110 that is embedded in the base 120 of the orientation controller. There is a three degree of freedom rotation system 125 connected to this rigid coordinate system, Rr 110. The three degree of freedom rotation system 125, allows the imaging device in its totality to move and adjust in three planes. Connected to the three degree of freedom orientation system 125 is another rigid coordinate system 130 that is the main coordinate system of the imaging device, Ri.

As shown in FIG. 1, the coordinate systems 150($a$-$c$) embedded in each of the imaging devices for the gray-scale cameras are labeled Rc1-RcN, where N is the number of cameras. If color cameras 165 are employed, the coordinate systems 160 are labeled Rrbg, and Rp is the coordinate system 170 embedded in the projector 175.

Ri 130 is embedded in the back plane 140 holding all of the individual devices, i.e., the cameras and projectors, of the imaging device. The coordinate systems of all of the individual optical devices are mechanically roughly aligned to be parallel to the common rigid coordinate system Ri 130. The mechanical axes, which is determined by the way in which the lense of the device is mounted during use, of each of the grey scale cameras 155($a$-$c$), the mechanical axes of the color camera 165 and the mechanical axes of the projector 175 are roughly perpendicular to the plane of the back plane 140. As depicted in FIG. 1, there are three grey scale cameras 155($a$-$c$), however this is not intended to be a limitation, there may be as few as two grey scale cameras. The maximum number of grey scale cameras 155($a$-$N_n$) is limited only by the size of the back plane 140 of the imagine device 105. Similarly, the number of color cameras 165 and projectors 175 shown is not intended to be a limitation.

Figure 2:
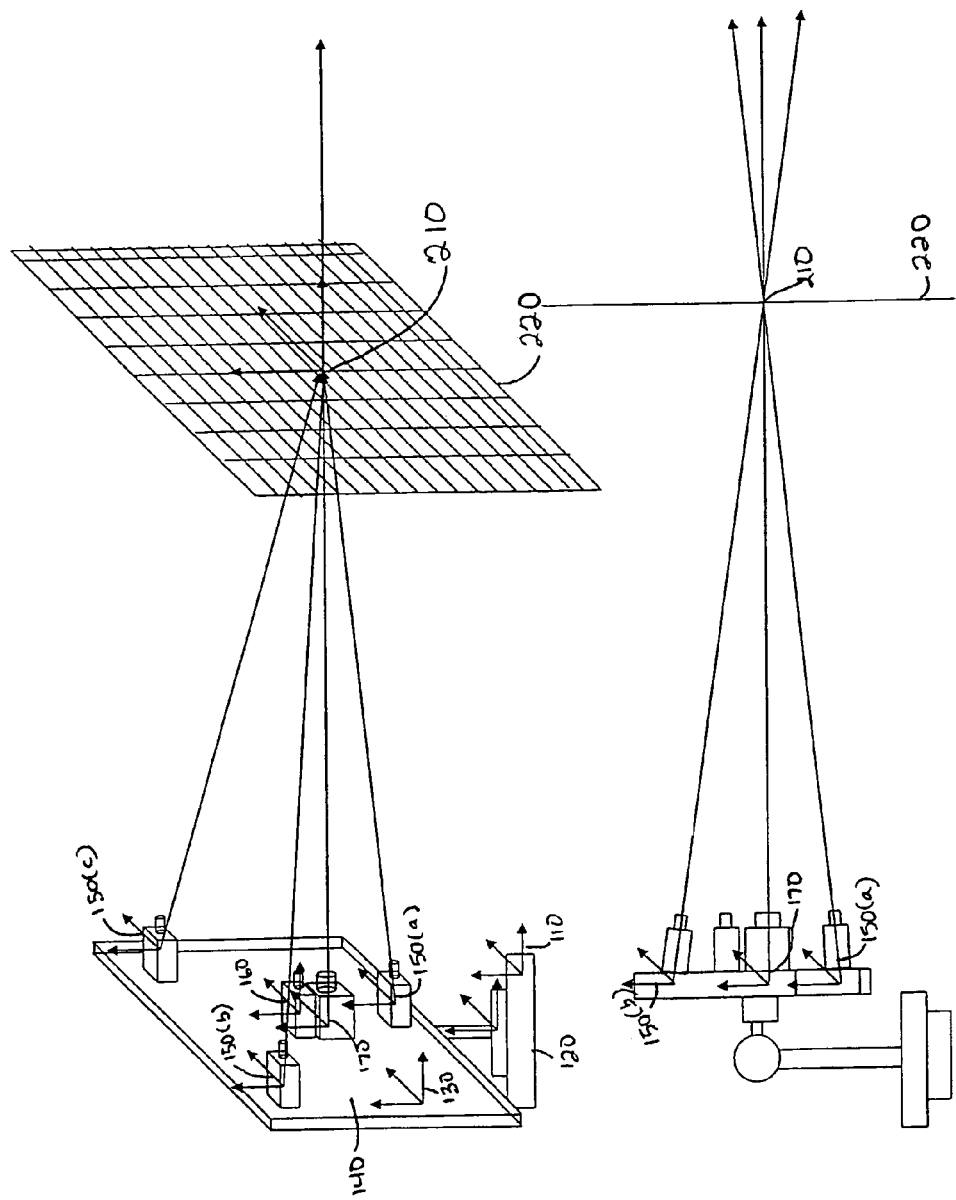
FIG. 2 is a side view of the focus plane of the projector system in alignment with the optical axes lines of convergence from the gray-scale cameras and the optical axes of the projector system.

The optical axes of the individual devices are not exactly parallel. They converge at a point 210 on a reference focal plane 220 of a projector as depicted in FIG. 2. Depending on the application that the imaging device 105 is to be used for, the optical axes 150($a$-$c$) of the more than one grey scale camera 155($a$-$c$) embedded in the imaging device 105 are designed to converge at the point 210 where the focal plane 220 is met by the perpendicular line directly from the center of the optical axes 170 of the projector 175 through that imaging plane. In most applications, this plane would be chosen to be the expected distance that the imaging device will be from the object to be imaged. For example, if the imaging device is expected to be 10 feet from the test subject, the focal plane 220 will be set at 10 feet. The imaging device 105 is then able to operate effectively anywhere from 4 to 16 feet from the test subject. The distances described are exemplar and are not intended to be a limitation.

The coordinate systems 150($a$-$c$), 160, 170 of each of the individual devices (i.e., the grey scale cameras, the color camera and the projector) are approximately aligned with the coordinate system 130 of the overall imaging device 105, which is connected by the three degree of freedom rotation system 125 to the rigid coordinate system 110 in the base 120 of the imaging device 105.

In addition to all the mechanical and geometric properties of the individual devices, each of the optical devices (i.e., the grey scale cameras and the color camera) has a number of internal variables that are determined by the settings of the cameras 155($a$-$c$), 165. For example, the zoom, focus and aperture of each of the individual cameras 155($a$-$c$), 165 is set as is the exposure time; gamma settings; gain controls; optical center, aspect ratio, logical pixel size, etc.

FIG. 2 is a representation of the focal plane 220 of the projector system as it aligns with the optical axes lines 230, 240, 250 of convergence from the gray-scale cameras 155($a$-$c$) and the optical axes 260 of the projector system 175.

The relationship between the various coordinate systems is illustrated in FIG. 2. As seen, the optical axes 260 of the projector 175 and the optical axes 230, 240, 250 of the cameras 155($a$-$c$), 165 all meet at a point of convergence 210 at the base focal plane 220. As the cameras 155($a$-$c$), 165 and projector 175 are rigidly fixed to the back plane 140 of the imaging device 105, the relationship between all of these coordinate systems can be described by a set of static rigid body transformations.

Figure 3:
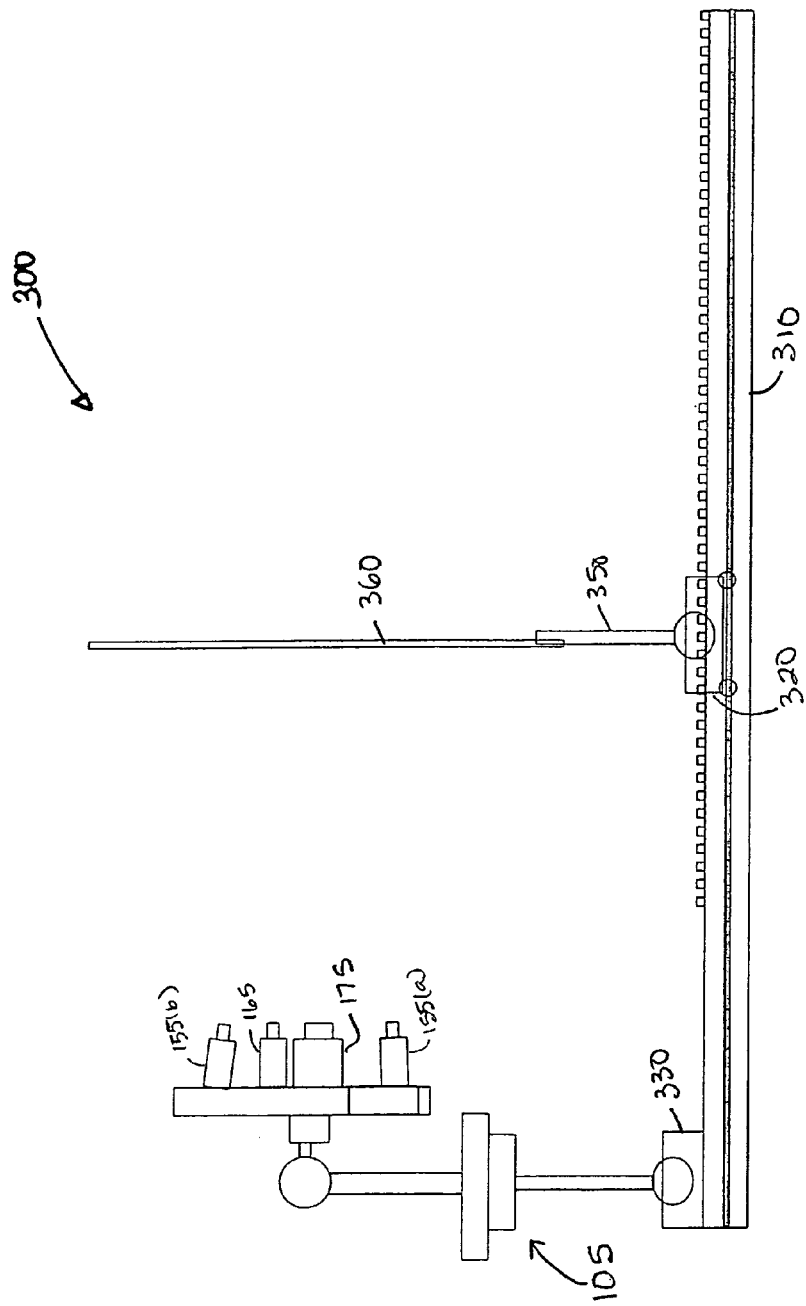
FIG. 3 is a side view of the system for performing internal calibration of an imaging device.
Figure 4:
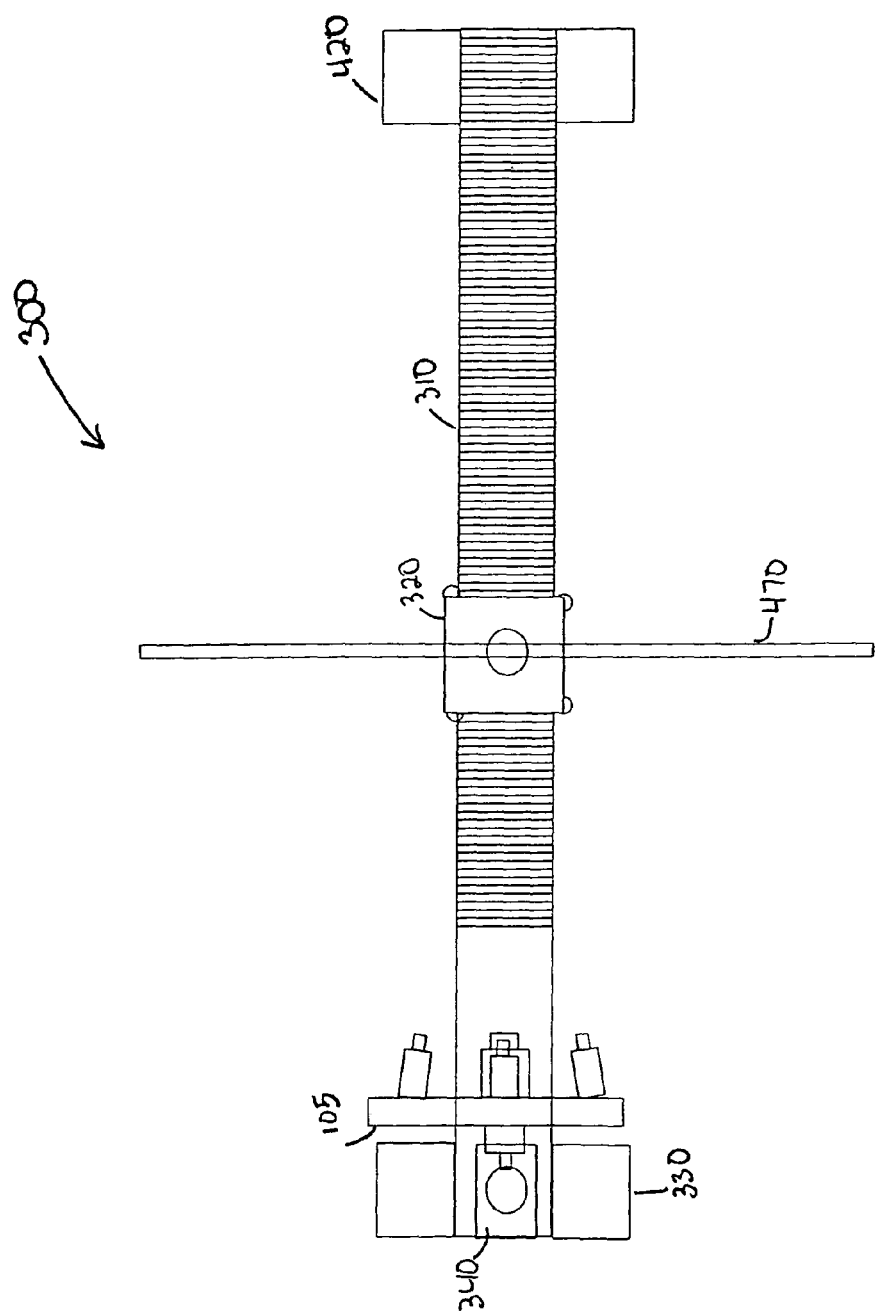
FIG. 4 is plane view of the system of FIG. 3.

FIGS. 3 and 4 depict an overall internal calibration system 300; FIG. 3 is a side view of the internal calibration system and FIG. 4 is a plane view of the internal calibration system. A long linear tracked device 310 with a step motor 420 included is laid on the floor or other level surface. A directional mount 330 connects to the tracked device 310. Mounted to the directional mount 330 is an individual imaging device system 105, such as that shown in FIG. 1, so that it may be calibrated. At the other end of the tracked device 310 is a mounting jig 320, extending from the mounting jig 320 is a perpendicular rod 350 which holds an alignment panel 360. Attached to the alignment panel 360 is a planar surface 470. This planar surface 470 is the calibration object. No features are required on this panel; the panel may be any size that is suitable for calibration purposes. For example the panel may be as small as 6 in by 6 in or as large as 10 ft by 10 ft. Preferably the panel is on the order of 3 ft tall by 3 ft wide, though other sizes may be appropriate depending on the imaging needs. This panel, the calibration object 470, is a flat planar surface with a light colored matte finish. The calibration object 470 is mounted on the overall calibration device at some fixed distance from the imaging system in order for calibration to be performed.

During calibration, the calibration object 470 translates along the optical axis of the calibration system 300. The extent of travel along the axis and the number of discrete steps taken along that axis varies depending on the application. A step is an incremental movement along the length of the track device. At each step of the travel, a complete internal calibration would be performed for each camera and projector. Details of the calibration process are given below.

Figure 5:
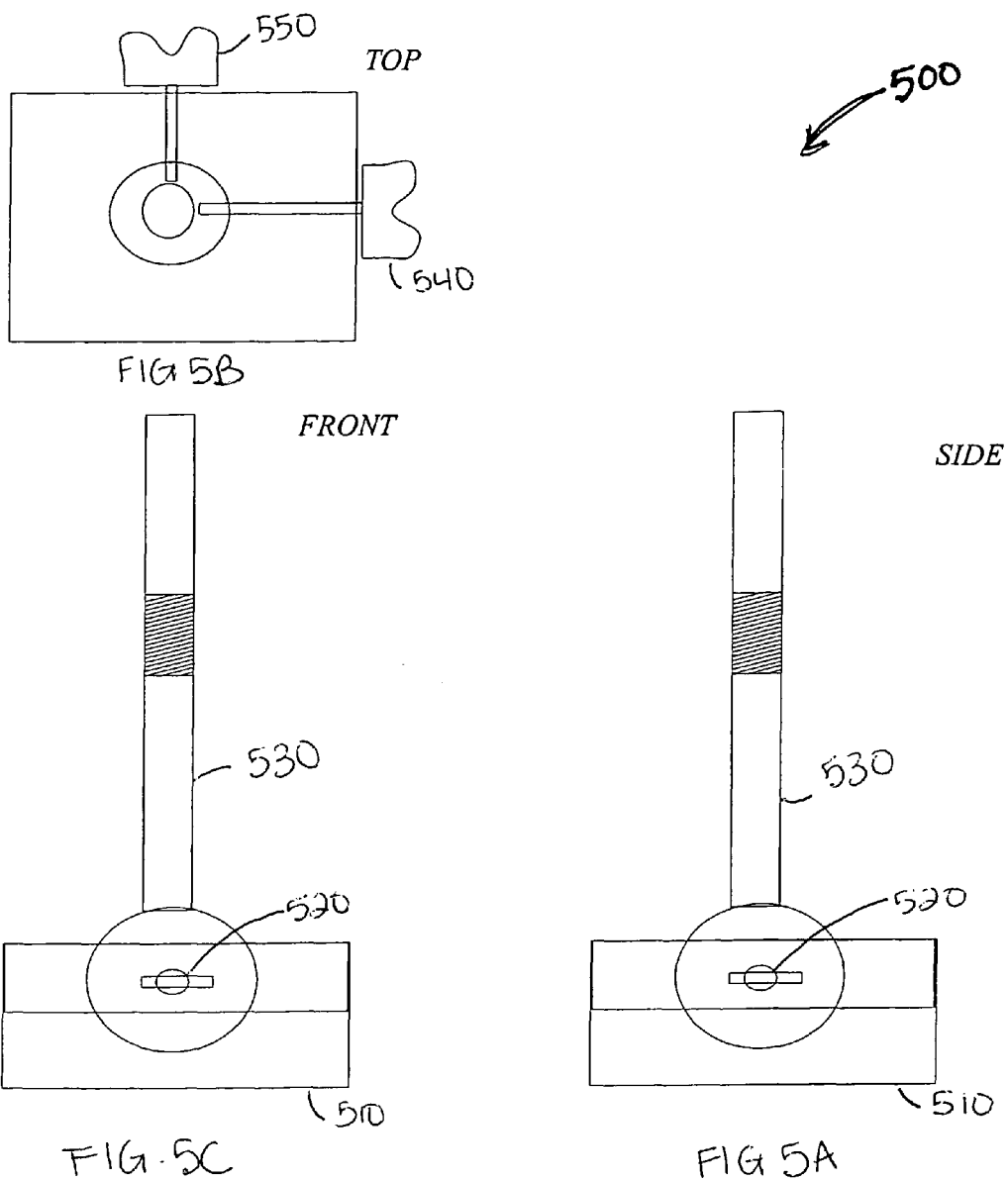
FIG. 5A is a side view of a mounting jig.
FIG. 5B is a plane view of the mounting jig of FIG. 5A.
FIG. 5C is a front view of the mounting jig of FIG. 5A.

The optical axis of the projector 170 is aligned with the calibration object 470 by setting the orientation of the imaging device 105 to neutral and using the directional mount 500 shown in FIG. 5. Using this directional mount 500, the imaging device 105 may be adjusted in all three planes. The neutral position is that alignment of the imaging device where none of the joints 125 are rotated.

In order to perform a calibration, the imaging device 105 is aligned perpendicularly to the calibration object 470. An image is then projected on the calibration object 470 and observed by the individual cameras 155($a$-$b$), 165. A human operator adjusts the focus on the projector 175 to make sure that the coded grid pattern projects in focus at the imaging device 105.

Figure 6:
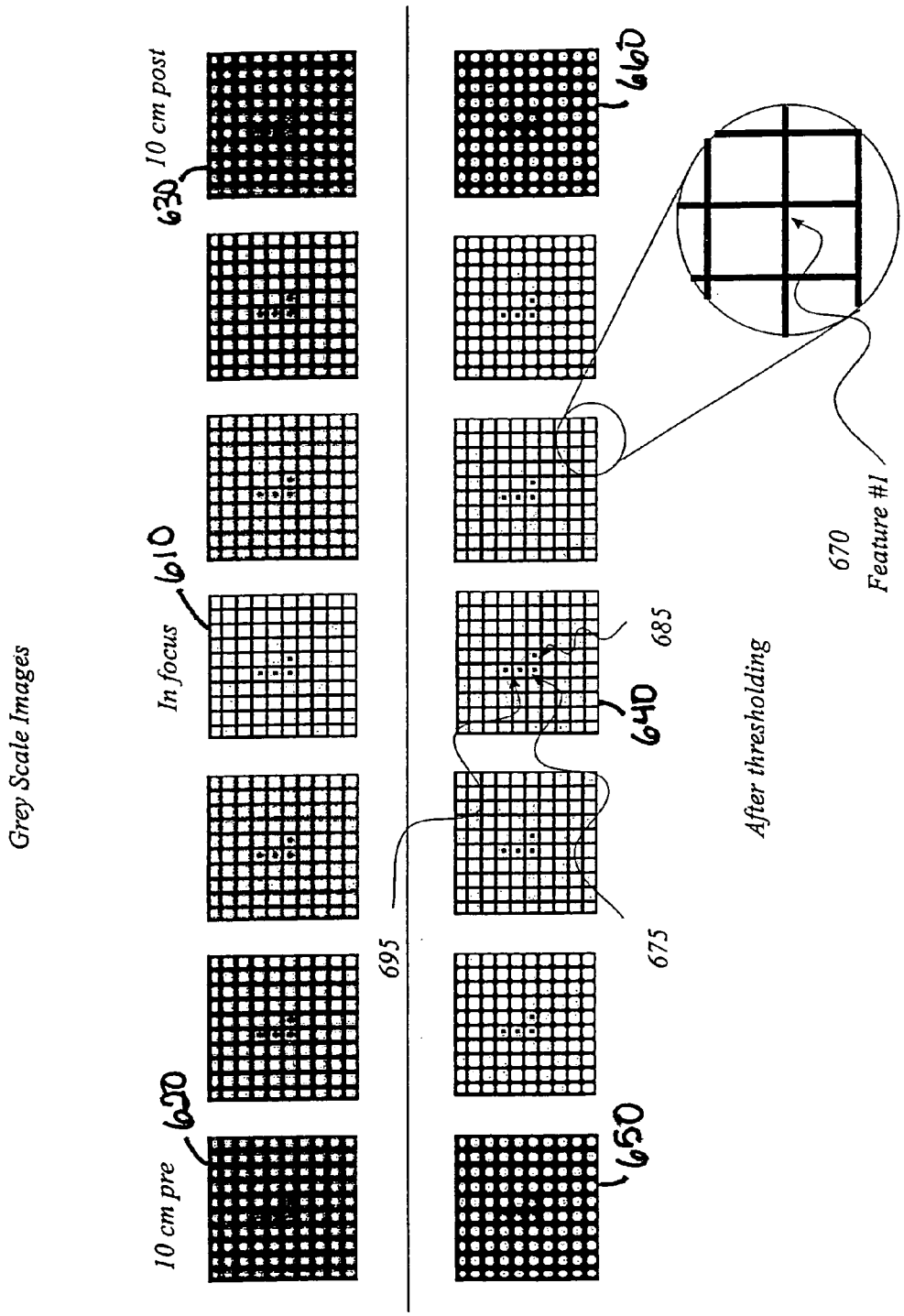
FIG. 6 is a front view of a focused and defocused calibration object.

Each grey scale camera 155(a-b) is then focused, zoomed and apertured to produce the desired reference image pattern in the grey scale cameras. The features are detected in each camera and repeated for all of the cameras on the imaging device. In operation, for example, if the imaging device 105 is going to be used to image one side of one-half of a large human, when the average distance between the calibration object 470 and the human is expected to be 8'±4' with a standard deviation of 2'. The neutral location of the calibration object 470 would be at 8 ft. from the imaging device 105. The focal control of the projector 175 is set to be in focus at the calibration object, and is adjusted manually if necessary. The imaging device is calibrated at this location, then the calibration object is moved one increment, i.e. to 8 feet, 1 inch, and the calibration procedure is repeated. This process is repeated until the entire length between 4 feet and 12 feet are calibrated. During the calibration procedure, each camera is focused and apertured to produce the desired reference image pattern in the camera. The features are detected in all cameras and the features between cameras are corresponded. That is, features detected in one camera are identified in another camera and a label (such as feature # 1) is attached to each feature point. A feature point is some element of the projected pattern that is discernible, for example, if projecting a grid pattern as illustrated in FIG. 6, one feature point 670 would be the intersection of two perpendicular lines. The correspondence between features is done using the coded imaging information shown in FIG. 6. At the center of each of the grid pattern are a number of non-regular features which can be used to determine the center 675, the right-ward orientation 685 and the upward orientation 695 of the projected calibration pattern of a feature. Therefore at any one incremental step, the known quantities are the distance from the calibration object to the imaging device and the size of the features that have been projected by the projector.

This information enables the three-dimensional location of all feature points on the calibration object to be calculated. Depending on the specific camera model used, some number of the 3D feature points and their 2D projections on the camera plane provide the data needed to calculate a parameterization of the camera. For example, if the DLT camera model of Abdel-Aziz and Karara, described immediately below, is to be used, eleven parameters will characterize the camera and then 6 or more feature points and their 2D projections on the camera plane will be used to calculate the parameterization. The internal camera parameters can be calculated by using any of a number of known algorithms. For example, the DLT approach as explained in Abdel-Aziz, Y. I., & Karara, H. M., Direct linear transformation from comparator coordinates into object space coordinates in close-range photogrammetry. Proceedings of the Symposium on Close-Range pPhotogrammetry (pp. 1-18). Falls Church, Va.: American Society of Photogrammetry (1971) which is incorporated herein in its entirety, may be used. In another calculation technique for example the high accuracy algorithm technique of R. Y. Tsai, as detailed in IEEE J. Robotics Automat, pages 323-344, Vol. RA-3, No. 4 1987, which is incorporated herein in its entirety, may be used. These are but two of the many algorithms that may be used.

The camera calibration parameters for objects that are correctly imaged on this focal plane are now known. This information is stored and is used when the imaging device is in operation and the specific parameters are set. For every attempt to focus the calibration projector on a focal plane at this distance from the imaging device, the internal parameters for the projector and for all of the cameras are therefore known.

The current set of camera calibration information is perfectly acceptable when the feature points are in focus at the focal plane for which the calibration was made. However, in operation, it will often be the case that the estimate of where the planar object is will be off by a small amount. Or, as would be more often the case, the imaging device is used for imaging a non-planar object. As a result, it is necessary to be able to handle the instance when the feature points are not in focus at an expected camera plane. The expected camera plane is that plane where the device is intended to operate at a time instant. This expected camera plane is selected by the system operator and is usually coincident with one aspect of the object being scanned. In order to perform this extended calibration step, the projector is intentionally misfocused from a distance of 10 cm short of the object to a distance 10 cm past the object. At each step along the tracked device in the defocusing procedure, a statistical analysis is performed of the images of the object being scanned as seen from each camera. All pixels are then attributed to either being a white background pixel or a black grid-pattern pixel. This statistical information is used for consistency checks when trying to determine the true location of a featured point during data acquisition and as a fine 3-D point calculation resolving approach, to be described later.

As previously described, in conjunction with FIG. 3 and FIG. 4 a directional mount 330 is employed. The directional mount 330 is used to align the optical axis of the imaging device 105 with the planar calibration object 470. FIGS. 5A, 5B, 5C depicts a representation of a directional mount 500. As shown in FIG. 5A, the directional mount 500 has at its base 510, a ball and socket joint 520 that allows three degree of freedom rotation changes of the overall mounting system. Extending up from the base 510 is a telescoping pole 530. FIG. 5B is a plane view of the mounting jig 500. As shown in FIG. 5B a first joint 540 allows rotation around the projector's optical axes and a second joint 550 allows the height of the imaging device to be adjusted.

In order to perform the calibration, the imaging device 105, is mounted in a directional mount such as that the directional mount 500 of FIG. 5A. The projector device 175 is brought into the direction mount and is rotated about the main axes of the directional mount until the projector device 175 is roughly aligned with the center of a calibration object 470. The telescoping pole 530 of the mounting jig 320 is now stretched or compressed, which raises and lowers the calibration object 470 until the optical axis of the projector device 175 is directly aligned with the center of the planar imaging calibration object 470. The roll about that optical axis of the projector system is now adjusted until the image is seen in each of the individual cameras of the imaging device is parallel to the top and bottom of the cameras. The fore and aft and up and down skew to the axial rotation is now adjusted until calibration squares at the bottom of the image are equal in size to calibration squares at the top of the image and the same right and left.

Once all of these rotations have been established, the imaging system is perfectly aligned and perpendicular to the planar calibration object. The features are now detected, three-dimensional coordinates calculated and, as explained, the three dimensional location of each of these feature points is calculated. Given this device information, all the information needed to determine the camera's internal parameters, using any number of different calibration algorithms as described above, is now possible.

FIG. 6 illustrates the detail of the defocusing calibration. The defocusing calibration provides additional information that can be used to validate and fine-tune the results of the initial camera calibration. As seen in the center, 610, 640, a bright crisp image showing the imaging system correctly focused on the calibration object is presented. As the system is moved to a defocused position ten centimeters previous 620, 650 to the calibration object, or a defocused position ten centimeters post 630, 660 the calibration object, the thickness of the feature lines increases, the system is seen to appear blurry and the darkness of the individual lines decreases. The defocusing phases are shown by the images between the focused and defocused grid patterns. This information is used to provide a mapping of the degree of defocus of any one of the individual sets of feature points either fore or aft of the expected plane. These sets of feature points can be grouped into sets of 4 points that can be treated geometrically as boxes.

One feature that can be examined is the width of the feature line, which is shown as a grid line in FIG. 6. For example, the line might average four-pixel thickness when focused. Coming to defocus, the thickness would increase to five or six pixels. The same thing would be possible using the size of the box or possibly the ratio of the number of white pixels per box to the number of black pixels per box.

This procedure, as described, provides sufficient information to validate and fine-tune the previously calculated internal camera parameters for each of the individual grey scale cameras, the color camera if employed, and the projection system.

As noted previously the forgoing descriptions of the specific embodiments are presented for purposes of illustration and description. They are not intended to be exhaustive or to limit the invention to the precise forms disclosed and obviously many modifications and variations are possible in light of the forgoing teachings. The system is limited only by the following claims.

What is claimed:

1. A method for determining a parameterization of the optical characteristics of an imaging device, the imaging device comprising at least one projection unit and at least one camera being under synchronized dynamic optical control; the method comprising performing the steps of:
   (a) positioning a calibration object at a focal plane at a distance of a plurality of distances from the imaging device;
   (b) aligning the calibration object at said focal plane with the imaging device;
   (c) projecting a pattern onto the calibration object at said focal plane;
   (d) detecting features of the pattern; and
   (e) using the detected locations of the features to calibrate elements of the imaging device to determine a set of calibration parameters for said focal plane; and
   repeating steps (a)-(e) for each focal plane at each of the other distances of the plurality of distances from the imaging device,
   wherein the performing and the repeating occur within a single calibration session.

2. The method of claim 1, wherein the distance between the calibration object and the imaging device along the optical axis of the projection unit is a known distance.

3. The method of claim 1, wherein the distance perpendicular to the optical axis defines a focal plane.

4. The method of claim 1, wherein a device is used to automate the process of repeating steps (a)-(e) for each focal plane at each of the other distances of the plurality of distances.

5. The method of claim 1, further comprising:
   (f) enabling an out of focus operation by projecting a pattern on the calibration object at a known out of focus distance;
   (g) detecting features of the pattern;
   (h) determining the variation of the features from those features at the in focus distance; and
   (i) calculating a mapping of the degree of de-focus of any set of feature points; and
   repeating steps (f)-(i) for each focal plane at each of the other distances of the plurality of distances from the imaging device,
   wherein the performing and the repeating steps (a)-(i) occur within the single calibration session.

6. The method of claim 5, wherein the feature is a line, and the variation between an in focus value of the line thickness is mapped to the out of focus value of the line thickness.

7. The method of claim 5, wherein the feature is a box, and the variation between an in focus value of the box size is mapped to the out of focus value of the box size.

8. The method of claim 5, wherein the feature is a box, and the variation between an in focus value of the ratio of white pixels to black pixels is mapped to the out of focus value of the ratio of white pixels to black pixels.

9. The method of claim 1, further comprising storing the plurality of sets of calibration parameters for setting parameters for focal planes at any of said plurality of distances when the imaging device is in operation.

10. A device for determining a parameterization of the optical characteristics of an imaging device, comprising:
    the imaging device, wherein the imaging device comprises at least one projection unit and at least one camera being under synchronized dynamic optical control; and
    a device configured to automate executing a process comprising performing the steps of:
    (a) positioning a calibration object at a focal plane at a distance of a plurality of distances from the imaging device;
    (b) aligning the calibration object at said focal plane with the imaging device;
    (c) projecting a pattern onto the calibration object at said focal plane;
    (d) detecting features of the pattern; and
    (e) using the detected locations of the features to calibrate elements of the imaging device to determine a set of calibration parameters for said focal plane; and
    repeating steps (a)-(e) for each focal plane at each of the other distances of the plurality of distances from the imaging device,
    wherein the performing and the repeating occur within a single calibration session.

11. The device of claim 10, wherein the distance between the calibration object and the imaging device along the optical axis of the projection unit is a known distance.

12. The device of claim 10, the process further comprising:
    (f) enabling an out of focus operation by projecting a pattern on the calibration object at a known out of focus distance;
    (g) detecting features of the pattern;
    (h) determining the variation of the features from those features at the in focus distance; and
    (i) calculating a mapping of the degree of de-focus of any set of feature points and repeating steps (f)-(i) for each focal plane at each of the other distances of the plurality of distances from the imaging device,
    wherein the performing and the repeating steps (a)-(i) occur within the single calibration session.

13. The device of claim 12, wherein the feature is a line, and the variation between an in focus value of the line thickness is mapped to the out of focus value of the line thickness.

14. The device of claim 12, wherein the feature is a box, and the variation between an in focus value of the box size is mapped to the out of focus value of the box size.

15. The device of claim 12, wherein the feature is a box, and the variation between an in focus value of the ratio of white pixels to black pixels is mapped to the out of focus value of the ratio of white pixels to black pixels.

16. The device of claim 10, in which the device is further configured to automate executing storing the plurality of sets of calibration parameters for setting parameters for focal planes at any of said plurality of distances when the imaging device is in operation.

\* \* \* \* \*